United States Patent
Overcash et al.

(10) Patent No.: US 11,677,759 B1
(45) Date of Patent: Jun. 13, 2023

(54) SYSTEM TO DETECT AND/OR PREVENT UNAUTHORIZED ACCESS TO A COMMUNICATION NETWORK

(71) Applicant: Cox Communications, Inc., Atlanta, GA (US)

(72) Inventors: Michael Paul Overcash, Duluth, GA (US); David Adam Taylor, Flowery Branch, GA (US); Yousef Wasef Nijim, Cumming, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 223 days.

(21) Appl. No.: 16/919,976

(22) Filed: Jul. 2, 2020

(51) Int. Cl.
*H04L 9/40* (2022.01)
*H04L 12/28* (2006.01)
*H04L 12/66* (2006.01)
*H04L 41/12* (2022.01)

(52) U.S. Cl.
CPC ...... *H04L 63/1416* (2013.01); *H04L 12/2801* (2013.01); *H04L 12/66* (2013.01); *H04L 41/12* (2013.01); *H04L 63/10* (2013.01)

(58) Field of Classification Search
CPC ..... H04L 12/2801; H04L 12/66; H04L 41/12; H04L 63/10; H04L 63/1416
See application file for complete search history.

(56) References Cited

U.S. PATENT DOCUMENTS

| | | | |
|---|---|---|---|
| 2008/0013612 A1 | 1/2008 | Miller | |
| 2008/0155661 A1* | 6/2008 | Arashin | H04L 63/08 726/4 |
| 2009/0180782 A1* | 7/2009 | Bernard | H04N 7/22 398/140 |
| 2010/0064225 A1* | 3/2010 | Cunningham | H04L 41/12 715/736 |

(Continued)

OTHER PUBLICATIONS

Hunter, Philip, "Standards Groups Unite Over DOCS IS Coexistence with Coax Home Networks", https:// www.thebroadcastbridge.com/content/entry /8081 /standards-g rou ps-u n ite-over-docsis-coexistence-with-coax-home-networks, Mar. 20, 2017. (Year: 2017).

(Continued)

*Primary Examiner* — Jeong S Park
(74) *Attorney, Agent, or Firm* — Merchant & Gould P.C.

(57) ABSTRACT

Aspects of the present disclosure provide for the detection and/or use of countermeasures to prevent and/or limit unauthorized devices from accessing and/or using another's communication network. An exemplary system includes a cloud controller and a gateway device that communicate via the infrastructure provided by a service provider communication network, wherein the gateway device operates in part to execute a device discovery algorithm to detect devices that are connected to a network facilitated by the gateway device and/or employ countermeasures to thwart further access by any unauthorized device. An exemplary method executes a device discovery algorithm to apply one or more of a plurality of device discovery protocols to detect devices (Continued)

that are connected to a network facilitated by a gateway device and/or implement countermeasures to block further access. Other aspects are described in detail herein.

20 Claims, 15 Drawing Sheets

(56) References Cited

U.S. PATENT DOCUMENTS

| | | | |
|---|---|---|---|
| 2011/0107436 A1* | 5/2011 | Cholas | H04N 21/2585 |
| | | | 726/29 |
| 2011/0219229 A1* | 9/2011 | Cholas | H04L 63/08 |
| | | | 713/168 |
| 2012/0320995 A1 | 12/2012 | Dabak | |
| 2013/0035108 A1 | 2/2013 | Joslyn | |
| 2013/0176900 A1* | 7/2013 | Jogadhenu | H04L 12/2801 |
| | | | 370/255 |
| 2014/0317294 A1 | 10/2014 | Ramesh | |
| 2015/0163290 A1* | 6/2015 | Ishida | H04W 80/085 |
| | | | 709/201 |
| 2015/0282189 A1 | 10/2015 | Learned | |
| 2017/0078252 A1* | 3/2017 | Klein | H04L 63/0428 |
| 2020/0252746 A1* | 8/2020 | Hodge | H04W 12/122 |

OTHER PUBLICATIONS

SCTE Standard, SCTE 235 2017, "Operational practice for the coexistence of DOCS IS 3.1 signals and MoCA signals in the home environment", 2017. (Year: 2017).
U.S. Appl. No. 16/846,871, filed Apr. 13, 2020 entitled "Automated Communication Channel Selection".

\* cited by examiner

Discovery protocol application table 700

| | Protocol 1 | Protocol 2 | Protocol 3 | Protocol 4 | Protocol 5 | Protocol 6 | Protocol 7 | Protocol 8 | Protocol 9 |
|---|---|---|---|---|---|---|---|---|---|
| Subscriber 1 | X | X | | | | X | | | |
| Subscriber 2 | | | X | X | | | X | X | X |
| Subscriber Group 1 | X | X | X | X | X | X | X | X | |
| Node Group 1 | X | X | X | | | X | X | | X |

FIGURE 7

```
C:\gateway>arp -a

Interface: 192.168.2.XX --- 0x1d
  Internet Address      Physical Address      Type
  192.168.2.            00                    dynamic
  192.168.2.            14                    dynamic
  192.168.2.            94                    dynamic
  192.168.2.            9c                    dynamic
  192.168.2.            c                     dynamic
  192.168.2.            b                     dynamic
  192.168.2.            0                     dynamic
  192.168.2.            0                     dynamic
  192.168.2.            c                     dynamic
  192.168.2.            94                    dynamic
  192.168.2.            b                     dynamic
  192.168.2.            0                     dynamic
  192.168.2.            c8                    dynamic
  192.168.2.            34-                   dynamic
  192.168.2.            0                     dynamic
  192.168.2.            f                     static
  224.0.0.              01-                   static
  224.0.0.              01                    static
  224.0.0.              01                    static
  239.255.255.                                static
  255.255.255.                                static Interface: 192.168.207    --- 0x23
  Internet Address      Physical Address      Type
  192                                         static
  224                   01-                   static
  224                   01                    static
  224                   01                    static
  239                                         static
```

FIGURE 8A

```
C:\gateway>netsh interface ipv6 show neighbors

Interface 29: Wi-Fi

Internet Address                Physical Address   Type
------------------------------  -----------------  ----------
2600:6c5a:4c                    00-00              Unreachable
2600:6c5a:4c                    14-dd              Stale
2600:6c5a:4c                    94-de              Stale
2600:6c5a:4c                    00-11              Stale
2600:6c5a:4c                    00-00              Unreachable
2600:6c5a:4c                    34-6               Stale
2600:6c5a:4c                    d2           -74-d2 Reachable (Router)
fe80::1:1                       08-a2-       Reachable (Router)
fe80::211                       00-          4-b4 Stale
fe80::211                       00-          e-c5 Reachable
fe80::366                       34           f-b0 Stale
fe80::39d                       b            23-87 Stale
fe80::405                       1            da-83 Stale
fe80::c49                       9            5c-f3 Stale
ff02:                           33-33        Permanent
ff02:                           33-33        Permanent
ff02:                           33-33        Permanent
ff02:                           33-3         Permanent
ff02:                           33-3         Permanent
ff02:                           33-3         Permanent
ff02:                           33-3         Permanent
ff02:                           3         2f Permanent
ff02:                           33           Permanent
ff02:                           33           Permanent
ff02:                           33        7 Permanent
ff02:                           3         0 Permanent
ff02:                           3         d2 Permanent
ff02:                           33           Permanent
ff02:                           3         8a Permanent Interface 1: Loopback Pseudo-Interface 1

Internet Address                Physical Address   Type
------------------------------  -----------------  ----------
ff02:                                              Permanent
ff02:                                              Permanent
ff02:                                              Permanent
ff02:                                              Permanent
ff02:                                              Permanent
ff02:                                              Permanent
ff02:                                              Permanent
ff02:                                              Permanent
ff02:                                              Permanent
ff02:                                              Permanent
ff02:                                              Permanent
ff02:                                              Permanent
ff02:                                              Permanent
ff02:                                              Permanent
```

```
Interface 20: Ethernet

Internet Address                          Physical Address    Type
---------------------------------------   -----------------   ----------
2600:6c5a                          0                      Unreachable
2600:6c5a                          0(                     Unreachable
2600:6c5a                          00                     Unreachable
2600:6c5a                          94                     Stale
2600:6c5a                          0(                     Unreachable
2600:6c5a                          0(                     Unreachable
2600:6c5a                          3                      Stale
2600:6c5a             :fe0d:74d2                          74-d2  Stale (Router)
fe80::1:1                          0(                     Unreachable (Router)
fe80::211:                                                5e-c5  Stale
fe80::3668                                                -5f-b0  Stale
fe80::39d6                                                0-00-00  Unreachable
fe80::4054                                                0-00-00  Unreachable
fe80::8617                                                00-00  Unreachable
fe80::c49c                                                -5c-f3  Stale
ff02::                   33-33-0(                         Permanent
ff02::                   33-33-0(                         Permanent
ff02::                   33-33-0(                         Permanent
ff02::                   33-33-0                          Permanent
ff02::                   33-33-0                          Permanent
ff02::                   33-33-0                          Permanent
ff02::                   33-33-0                          Permanent
ff02::                       33-                          32  Permanent
ff02::                       33-                          49  Permanent
ff02::                      33-33                         Permanent
ff02::                      33-33                         Permanent
ff02::                       33-3                         0  Permanent
ff02::                       33-                          d2  Permanent
ff02::                       33-                          8a  Permanent
ff02::                       33-3                         0  Permanent
ff02::                       33-3                         a  Permanent
ff02::                       33-3                         99  Permanent
```

```
Interface 19: Bluetooth Network Connection

Internet Address                    Physical Address   Type
-------------------------------------------------------------------
fe80::1                   00-0               Unreachable
fe80::2                       00-            Unreachable
fe80::3        0              00             Unreachable
fe80::3        d1             0              Unreachable
fe80::4        b6             0              Unreachable
fe80::8        4              00-            Unreachable
fe80::8        a              00-            Unreachable
fe80::c        8a             0              Unreachable
ff02::2                       33-33-0        Permanent
ff02::1                       33-33-         Permanent
ff02::fb                      33-33-0        Permanent
ff02::1                       33-33-         Permanent
ff02::1                       33-33-         Permanent
ff02::1                       33-3         2 Permanent
ff02::1                       33-         -32 Permanent
ff02::1                       33-          cf Permanent
ff02::1                       33-         -18 Permanent
ff02::1                       33-3         9 Permanent
ff02::1                       33-         da Permanent
ff02::1                       33-         de Permanent
ff02::1                       33-         3d Permanent
ff02::1                       33-          24 Permanent Interface 25: Local Area Connection* 13

Internet Address                    Physical Address   Type
-------------------------------------------------------------------
fe80::1                   00-                 Unreachable
fe80::2                                       )0-00 Unreachable
fe80::3                                       )0-00 Unreachable
fe80::3                                       -00-00 Unreachable
fe80::4                                       -00-00 Unreachable
fe80::8                                       )0-00 Unreachable
fe80::8                                       )0-00 Unreachable
fe80::c                                       -00-00 Unreachable
ff02::2                       33-3            Permanent
ff02::1                       33-             Permanent
ff02::fb                      33-3            Permanent
ff02::1                       33-             Permanent
ff02::1                       33-             Permanent
ff02::1                       3             2 Permanent
ff02::1                                    32 Permanent
ff02::1                                    cf Permanent
ff02::1                                    18 Permanent
ff02::1                       3             9 Permanent
ff02::1                                    da Permanent
ff02::1                                    e Permanent
ff02::1                                    d Permanent
ff02::1                                    4 Permanent
```

FIGURE 8D

Interface 35: vEthernet (Default Switch)

Internet Address          Physical Address  Type
--------------------------------------------  ----------
fe80::3                   00-0              Unreachable
fe80::3                   00-0              Unreachable
fe80::4                   00-0              Unreachable
fe80::c                   00-0              Unreachable
ff02::1                   33-               Permanent
ff02::2                   33-               Permanent
ff02::c                   33-               Permanent
ff02::1                   33                Permanent
ff02::fb                  33-               Permanent
ff02::1                   33                Permanent
ff02::1                                -40  Permanent Interface 15: Ethernet 4

Internet Address          Physical Address  Type
--------------------------------------------  ----------
fe80::                    00-0              Unreachable
fe80::                                 0    Unreachable
fe80::                                 00   Unreachable
fe80::                                 -00  Unreachable
fe80::                                 -00  Unreachable
fe80::                                 0    Unreachable
fe80::                                 0    Unreachable
fe80::                                 -00  Unreachable
ff02::                    33-3              Permanent
ff02::                    33-3              Permanent
ff02::                    33-3              Permanent
ff02::                    33-3              Permanent
ff02::                    33-3              Permanent
ff02::                    33                Permanent
ff02::                                    2 Permanent
ff02::                                    f Permanent
ff02::                                    8 Permanent
ff02::                    3                 Permanent
ff02::                                    a Permanent
ff02::                                    e Permanent
ff02::                                    d Permanent
ff02::                                    4 Permanent 802 cont'd

Interface 11: Local Area Connection* 16

| Internet Address | Physical Address | Type |
|---|---|---|
| fe80:: | 00-… | Unreachable |
| fe80:: | 0… 0 | Unreachable |
| fe80:: | 0… 0 | Unreachable |
| fe80:: | …-00 | Unreachable |
| fe80:: | …-00 | Unreachable |
| fe80:: | 0… 0 | Unreachable |
| fe80:: | 0… 0 | Unreachable |
| fe80:: | …-00 | Unreachable |
| ff02:: | 33-3… | Permanent |
| ff02:: | 33-… | Permanent |
| ff02:: | 33-3… | Permanent |
| ff02:: | 33-… | Permanent |
| ff02:: | 33-… | Permanent |
| ff02:: | 3… 2 | Permanent |
| ff02:: | … 32 | Permanent |
| ff02:: | … f | Permanent |
| ff02:: | … 18 | Permanent |
| ff02:: | 3… | Permanent |
| ff02:: | … a | Permanent |
| ff02:: | … e | Permanent |
| ff02:: | … d | Permanent |
| ff02:: | … 4 | Permanent |

FIGURE 8F

SYSTEM TO DETECT AND/OR PREVENT UNAUTHORIZED ACCESS TO A COMMUNICATION NETWORK

BACKGROUND

A technical problem exists with the continuing development of countermeasures to thwart unauthorized access to a communication network, such as when an unauthorized device attempts to access and use another's home or business communication network. Multimedia over Coax Alliance (MoCA®) technology enables an extension of a subscriber communication network by using existing coaxial infrastructure to transport high quality, consistent signals to connected devices (i.e., MoCA® nodes) located at a subscriber location. For example, a subscriber may deploy a gateway device with an MoCA® router interface and/or one or more MoCA® adapters that allow various MoCA®-enabled devices to communicate over an established MoCA® network. However, unauthorized devices may be able to connect to and access another's MoCA® network adding to the technical problem associated with unauthorized access and use of unauthorized networks and/or equipment. A point of entry (POE) filter can be used (if installed properly) in attempting to prevent signal leakage, unintentional linking of networks, and/or intrusion of communication signals over an established MoCA® network. However, faulty installation or insufficient attenuation of a POE filter can still lead to unauthorized access or unintentional linking to another's MoCA® network. Moreover, POE filters can be easily removed or bypassed to provide ready access to another's MoCA® network. Accordingly, the present disclosure provides at least one technical solution to the technical problems associated with preventing or limiting access to an unauthorized communication network.

SUMMARY

Aspects of the present disclosure disclose a system, method, and computer readable storage device, but is not so limited, to provide detection of unauthorized devices and/or countermeasures to prevent and/or limit unauthorized devices from accessing and/or using another's communication network. A system of an embodiment includes a cloud controller and a gateway device that communicate in part via the infrastructure provided by a service provider communication network, wherein the system operates in part to execute a device discovery algorithm to detect devices that are connected to a local network facilitated by the gateway device and/or employ countermeasures to thwart further access by any unauthorized device. A method of an embodiment executes a device discovery algorithm to apply one or more of a plurality of device discovery protocols to detect devices that are connected to a local network and/or use countermeasures to prevent unauthorized access. A computer readable device of an embodiment includes executable instructions configured to execute a device discovery algorithm to apply one or more of a plurality of device discovery protocols to detect devices that are connected to a local network and/or use countermeasures to prevent unauthorized access. Other aspects are described in detail herein and the summary provides a brief overview of the technology used and employed.

The details of one or more aspects are set forth in the accompanying drawings and description below. Other features and advantages will be apparent from a reading of the following detailed description and a review of the associated drawings. It is to be understood that the following detailed description is not intended to be restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views:

FIG. 7 depicts an exemplary discovery protocol application table according to an embodiment;

FIGS. 8A-8F depict a plurality of device discovery protocol applications and the corresponding detection output according to an embodiment;

DETAILED DESCRIPTION

Figure 1:
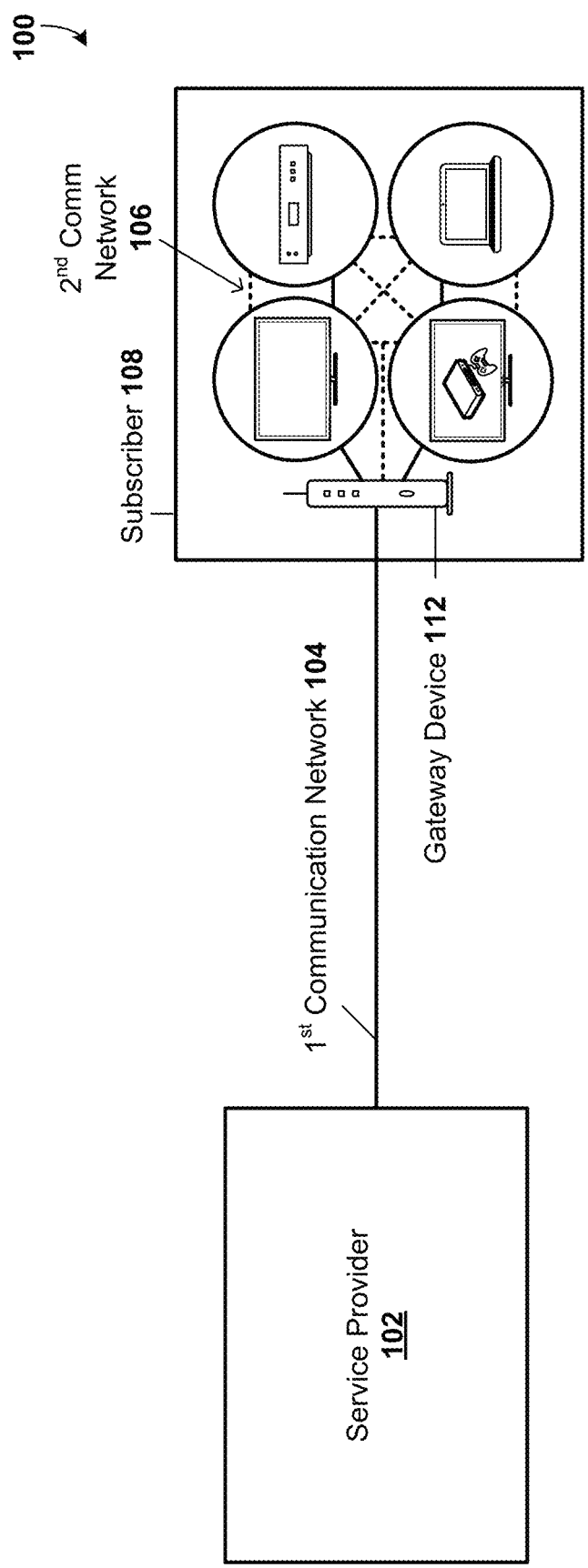
FIG. 1 is a block diagram of an example environment in which aspects of the present disclosure can be implemented.

FIG. 1 is a block diagram of an example communication environment 100 that includes a service provider 102 that provides one or more services (e.g., video, telephony, Internet data, etc.) to a plurality of subscribers (generally 108) over one or a combination of networks (i.e., first communications network 104, such as the Internet for example). As an example, a service provider 102 network may include a hybrid fiber coax communication infrastructure to provide cable television (CATV) and Internet services to a subscriber 108 location that includes a gateway device 112. A service provider 102 may provide services according to a standardized communication protocol, such as a version of the DOCSIS® standard for example. The standardized communication protocol according to which the service provider 102 operates may define upstream and downstream channels to enable bidirectional communications between the service provider 102 and a subscriber 108.

Figure 2:
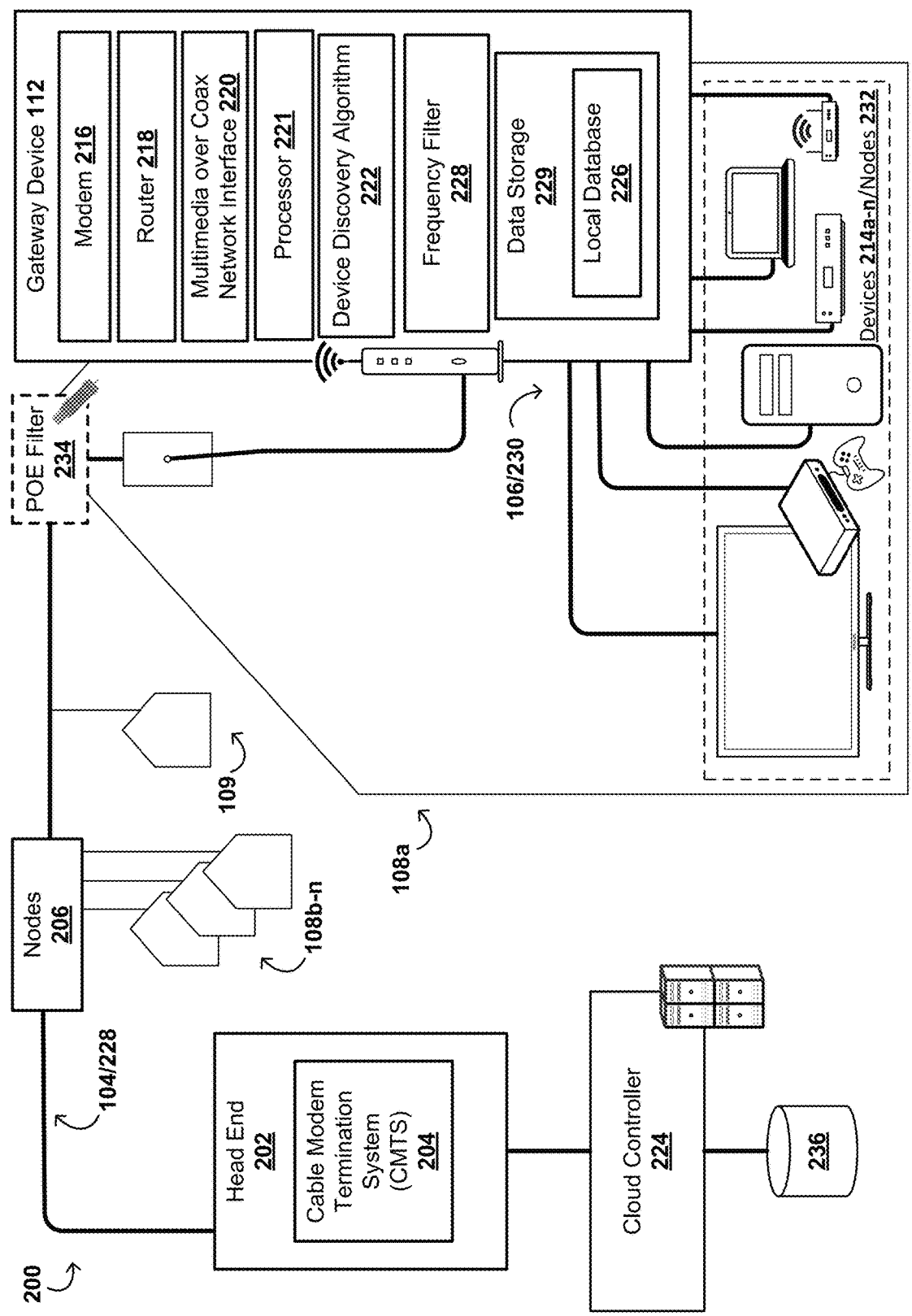
FIG. 2 is a block diagram showing components of an example system according to an embodiment.

Gateway device 112 is configured to connect the service provider 102 network (i.e., first communications network 104) to a second communication network 106 (e.g., a Local Area Network (LAN), a Wireless Local Area Network (WLAN), a Personal Area Network, or other type of network) at a location of a first subscriber (e.g., location of subscriber 108a of FIG. 2). As described below, the gateway device 112 includes a MoCA® communication interface 220

(FIG. 2) that enables establishment of a MoCA® network at the subscriber 108 location. For example, gateway device 112 can include the following operational characteristics:

Input Voltage (nominal) 115 VAC, 50/60 Hz
RF Downstream
Bonded Channels Up to 24
Tuner Configuration Full capture tuning range
Frequency Range (MHz) 108-1002 DOCSIS
Data Rate (Mbps Max.) Up to 960
RF Input Sensitivity Level (dBmV) −15 to +15 (DOCSIS))
RF Upstream Frequency Range (MHz) 5 to 42 or 5 to 85 depending on model
Wireless Frequency Range 2.5 GHz and 5 GHz
MoCA® Frequency Range (MHz) 1150-1500
Max PhyRate (Mbps) 700
Application Data Rate (Mbps) 400+ bidirectional combined Gateway device 112 can use the MoCA® interface 220 to send beacon carriers throughout MoCA® network 230 (FIG. 2) looking for other MoCA®-enabled devices to establish a connection. Due in part to the signal characteristics, MoCA® signals can inadvertently transmit information beyond an intended network (e.g., a subscriber home or business). As described herein, the gateway device 112 can include a device discovery algorithm 222 (FIG. 2), described below, that operates in part to detect devices and/or implement countermeasures to any discovered unauthorized or unknown devices that are connected to the second communication network 106. As described herein, gateway device 112 can work in conjunction with a cloud controller 224 (FIG. 2) of the service provider 102 as part of detecting unauthorized devices and/or preventing or blocking any unauthorized devices from connecting or having continued access to an unauthorized network, such a user who is not authorized to access the second communication network 106.

In example aspects, the second communication network 106 may be configured to include a MoCA® network 230 to distribute and share high speed data communications among end devices (i.e., MoCA® nodes 232) at the subscriber 108 location using coaxial wiring at the location. For example, the gateway device 112 may be MoCA®-enabled and configured to provide an Ethernet delivery service using high-frequency carrier waves, which may be mixed with the service provider signal and transmitted to various devices using coaxial cables. Second communication network 106 enables connected devices to form a full mesh peer-to-peer network. As can be appreciated, the second communication network 106, when utilized as a MoCA® network, may deliver reliable, low-latency, and high speed data transmissions that may be advantageous for streaming videos, online gaming experiences, multi-room DVR use, extending wired and wireless networks, etc.

In some examples, one or more components may be included in the gateway device 112. In other examples, one or more components may be included in a separate device local to the second communication network 106 and operatively connected to the gateway device 112. In other examples, one or more components may operate on a remote server in a distributed network, such as the Internet, or on a network device in the service provider network (i.e., first communications network 104). The example communication environment 100 may include one or more computing devices such as servers, workstations, set top boxes, desktop computers, laptop computers, tablets, mobile phones, smart devices, gaming devices, IoT devices, cameras, one or more databases, etc. Further details of the computing devices and variations thereof can be found in FIGS. 9 and 10.

FIG. 2 is a block diagram of an system 200 where the first communications network 104 is embodied as an example HFC network 228 and the second communication network 106 is embodied as a subscriber network (e.g., a local network) at a first location, such as a residential or a business location. Components of the system 200 can be integrated, distributed, and/or provided in any combination of separate systems/components, wherein FIG. 2 provides one implementation example. The HFC network 228 may extend from a head end 202 of the service provider 102 to a plurality of network nodes 206, where each node serves a plurality of subscribers 108. For example, each node 206 may serve 200 to 1,000 subscribers within a service area, where the subscribers may subscribe for residential and/or business services.

The service provider 102 may use a cable modem termination system (CMTS) 204 located at the head end 202 to provide high speed data services such as cable, Internet, voice, data, etc. to the various subscribers 108a-n. For example, the CMTS 204 may encode, modulate, and upconvert one or more of the services onto radio frequency (RF) carriers, combine the RF carriers into a single electrical signal, and provide the electrical signal to a broadband optical transmitter. The broadband optical transmitter may convert the electrical signal to a downstream optically modulated signal that is sent to one or more of the network nodes 206 over one or more fiber optic cable lines or conveying infrastructure.

Each node 206 may include a broadband optical receiver to convert the downstream optically modulated signal to an electrical signal (e.g., translate the signal from a light beam to RF). The node 206 may transmit the electrical signal over one or more coaxial cable lines to a gateway device 112 of a subscriber 108a serviced by the node 206. Each subscriber 108 within a set of subscribers 108a-n may have at least one gateway device 112 at their particular location. Upon receipt of the electrical signal, modem 216 included in the gateway device 112 (or as a separate device) may demodulate the electrical signal in order to deliver the services to one or more devices 214a-n of the subscriber 108, including desktop computers, laptop computers, mobile phones, tablets, gaming devices, televisions, IoT devices, cameras, among other examples.

The HFC network 228 may operate bi-directionally, whereby signals are transmitted in both downstream and upstream directions. For example, downstream signals may transmit data from the head end 202 to the gateway device 112 via the respective node 206. The data transmitted in the downstream signals may include content associated with the one or more services being provided, such as video content, voice data, and Internet data, among other examples. The upstream signals may transmit data from the gateway device 112 to the head end 202 via the node 206.

With continuing reference to FIG. 2, gateway device 112 may include a router 218 (which can also be deployed as a separate device) that enables various connected devices 214 to join a local network (e.g., second communication network 106) and to communicate via the HFC network 228. The router 218 is configured to connect devices 214 to the local network wirelessly (e.g., provide a wireless network). As described briefly above, gateway device 112 may also include or be operatively connected to a MoCA® interface 220 operative or configured to support MoCA® communications in association with utilizing a coaxial cable network at a location (e.g., residence or business location) of a subscriber 108a to broadcast signals to connected devices 214 within a defined communications frequency range as defined by MoCA® standards. For example, the local network (i.e., second communication network 106) may be configured as a MoCA® network 230 in which devices 214/MoCA® nodes 232 are networked together in a MoCA® architecture using MoCA® technology, wherein the MoCA® interface 220 may be configured to provide an Ethernet delivery service using high-frequency carrier waves within a defined MoCA® frequency range, which may be mixed with the service provider signal and communicated to various devices using coaxial cables.

As described above, unauthorized devices may be able to connect to and access the second communication network 106 of first subscriber 108a (e.g., neighbor, adjacent business, etc. generally shown as unauthorized MoCA® network device 109) of another subscriber via communication frequencies within the MoCA® frequency range 122. For example, unauthorized MoCA®-enabled devices at a nearby location, such as a set-top box installed in a neighbor's house that is connected via MoCA®, an alarm keypad on a neighbors account that is connected via MoCA®, etc. may be detected by system 200. According to an aspect, and as described in detail below, gateway device 112 can include a processor 221 that executes a device detection algorithm 222 in part to detect unknown and/or unauthorized devices connected to a local network of another user including a MoCA® network.

The gateway device 112 can also be configured with control circuitry to provide control signals to select communication components (e.g. POE filter, unauthorized device(s), cloud controller 224, frequency filter 228, disable MoCA® interface 220, etc.) to block or limit access to the second communication network 106. The device detection algorithm 222 of an embodiment includes application of one or more tailored device discovery protocols for use at a subscriber location to detect and/or block unauthorized devices from accessing the second communication network 106. As described herein, tailored discovery algorithms can be configured to encompass various types and/or timing of application of one or more of a plurality of discovery protocols according to the characteristics of particular communication networks, devices and/or interfaces.

As an example, gateway device 112 can run the device detection algorithm 222 and apply one or more of a plurality of device discovery protocols including an MoCA® controller discovery protocol, a Dynamic Host Configuration Protocol (DHCP) discovery protocol, a DHCP version 6 (v6) discovery protocol, an Internet Protocol (IP)v6 Neighbor discovery protocol, an IPv6 Router advertisements discovery protocol, an Address Resolution Protocol (ARP) discovery protocol, an Universal Plug and Play (UPnP) and/or Digital Living Network Alliance (DLNA) discovery protocol, an multicast Domain Name System (mDNS) discovery protocol, and/or a Wi-Fi Access Point discovery protocol.

According to an embodiment, at select times, the gateway device 112 executes the device detection algorithm 222 to detect unknown devices connected to or attempting to access the second communication network 106. As shown in FIG. 7, device detection algorithm 222 can refer to a discovery protocol application table 700 that includes tailored discovery protocols for applying at a subscriber location or group of subscriber locations. Any discovered devices, including any authorized devices, unknown devices, and/or unauthorized devices, can be stored in a local device discovery database 226 that also includes output information resulting from execution of the device discovery algorithm 222 and any corresponding device discovery protocols used. For example, local device discovery database 226 can store detection information associated with discovered devices, such as MAC addresses, IP addresses, time(s) of detection, discovery protocol(s) used, time(s) of application of discovery protocol(s), etc. All or a portion of the detection information may be obfuscated (e.g., cryptographic hashing) to maintain privacy and/or compliance with any applicable privacy laws. In some cases, the detection information associated with unknown and/or unauthorized devices can be deleted from local and/or remote storage after performing any countermeasures to prevent or limit further access by an unauthorized device.

While example application implementations of various device discovery protocols are described below, it will be appreciated that an order, usage frequency, select protocol combinations, times and/or intervals of protocol applications are configurable and can be implemented in many ways. In one implementation example, the device detection algorithm 222 comprises executable code that may be executed by processor 221 of the gateway device 112 or another component. According to an embodiment, the executable code can be configured with a query to load a discovery protocol application table to identify and apply one or more particular device protocols tailored for a subscriber or group of subscribers.

As an implementation example and as part of the running the device detection algorithm 222, the gateway device 112 can execute an MoCA® controller discovery protocol at select times and/or intervals in order to discover MoCA® nodes connected to the second communication network 106. The MoCA® controller discovery protocol can be included with the MoCA® interface 220 and operates to discover other MoCA® nodes in communication with the second communication network 106 of subscriber 208a. For example, the MoCA® interface 220 can transmit and/or receive connection requests from MoCA® nodes distributed throughout a household or business location. As discussed above, a technical problem exists, in some instances, where bleed through communications from an unknown MoCA® device occurs within the second communication network 106. As described herein, detection of an unknown MoCA® device can be used to discover an identity of the unknown MoCA® device by referring to the local device discovery database 226 stored in storage 229 and/or the cloud controller storage 236 associated with the service provider 102 to determine if the unknown MoCA® device is included in a blocked list or an allowed list (e.g., MAC address, network address, device ID, IP address, etc.).

In some examples, as part of instructing the MoCA® interface 220 to initiate discovery, the gateway device 112 may access information stored in the cloud controller storage 236, such as previously-obtained network and device information, identify devices 214 associated with the subscriber's account, and/or instruct the MoCA® interface 220 to attempt to communicate with the identified devices in order to determine if the devices are MoCA® capable. In some examples, as part of the discovery, the MoCA® interface 220 may be instructed to initiate a MoCA® node discovery process, where the MoCA® interface 220 may transmit beacon messages for discovery. For example, beacon messages may be transmitted on a particular beacon channel, and MoCA® nodes 232 receiving a beacon message may transmit a message to the MoCA® interface 220 in response to the beacon message. In some examples, the response messages include information about the MoCA® nodes 232 and specify attributes of the traffic flow between nodes, which can be used to determine the MoCA® network topology (e.g., MAC addresses, IP addresses, types of MoCA® nodes 232 that are on the network, the version of MoCA® (i.e., which MoCA® protocol(s)) that the nodes support, modulation type used, the MoCA® frequency spectrum range usages by the nodes, data rates and signal strengths between MoCA® nodes 232, hardware version information, software version information, etc.)

As an implementation example and as part of the running the device detection algorithm 222, the gateway device 112 can execute a Dynamic Host Configuration Protocol (DHCP) discovery protocol to: obtain an IP version 4 (v4) address from an upstream DHCP service, provide a DHCP relay and forward User Datagram Protocol (UDP) DHCP messages from clients on the second communication network 106 to and from a DHCP server, and provide a DHCP server whereby the router/switch services DHCP requests directly.

As another implementation example and as part of the running the device detection algorithm 222, the gateway device 112 can execute a DHCPv6 Server discovery protocol and act as a DHCPv6 server to the second communication network 106. For example, neighbor discovery followed by a stateless or stateful DHCPv6 client can occur on a link between the gateway device 112 and user devices connected to the second communication network 106. The service provider 102 can delegate an IPv6 prefix (i.e. range of addresses) to the gateway device 112, and the gateway device 112 will provision addresses from that range to clients using either DHCPv6 or Stateless Address Autoconfiguration (SLAAC).

As another implementation example and as part of the running the device detection algorithm 222, the gateway device 112 can execute an IPv6 neighbor discovery protocol that uses a set of messages and processes defined in RFC 4861 that determine relationships between neighboring nodes. IPv6 neighbor discovery protocol can be used to: resolve the link-layer address of a neighboring node to which an IPv6 packet is being forwarded, determine when the link-layer address of a neighboring node has changed, determine whether a neighbor is still reachable, discover neighboring routers, auto configure addresses, address prefixes, routes, and resolve other configuration parameters.

As yet another implementation example and as part of the running the device detection algorithm 222, the gateway device 112 can execute an IPv6 router advertisements discovery protocol to advertise router presence, host configuration parameters, routes, and on-link prefixes, and inform hosts of a better next-hop address to forward packets for a specific destination.

As yet another implementation example and as part of the running the device detection algorithm 222, the gateway device 112 can execute an Address Resolution Protocol (ARP) discovery protocol to convert an IP address to a corresponding physical network address (e.g., MAC address). IP-to-MAC address mappings are typically determined from an ARP cache maintained on each device. If an IP address does not appear in a device's cache, that device cannot direct messages to a corresponding endpoint device without a new mapping which includes sending an ARP request broadcast message from an initiating device on the second communication network 106. The host with a given IP address sends an ARP reply in response to the broadcast, allowing the initiating device to update its cache and proceed to deliver messages directly to a corresponding endpoint device.

As another implementation example and as part of the running the device detection algorithm 222, the gateway device 112 can execute an Universal Plug and Play (UPnP) and/or Digital Living Network Alliance (DLNA) discovery protocol to automatically communicate and share media files with other connected DLNA devices on the second communication network 106. DLNA certified devices can locate and play movies, share, view and print photos, share and listen to music, etc. between compatible network-connected devices. Illustrative examples include, a DLNA device sending audio and video from a mobile device to a DLNA-certified TV, accessing audio, video, or photos on a DLNA-certified PC and using them on a certified TV or Blu-ray player, and sending photos from a certified digital camera to a DLNA-certified TV, PC or other DLNA device.

As another implementation example and as part of the running the device detection algorithm 222, the gateway device 112 can execute a multicast Domain Name System (mDNS) discovery protocol to use DNS programming interfaces, packet formats and operating semantics, in a small network where no conventional DNS server is installed to send IP packets to every node on the second communication network 106 with a reserved mDNS multicast address so that connected devices respond with their respective service capabilities.

As yet another implementation example and as part of the running the device detection algorithm 222, the gateway device 112 can execute a Wi-Fi Access Point discovery protocol to detect and collect information about Wi-Fi devices within the radio detection range and learn MAC addresses of stations (clients) associating with the network 106. While a number of different types of device discovery protocols are described herein, it will be appreciated that different and new types of discovery protocols can be implemented according to the particular hardware and communication architecture utilized in the service provider network 104, second communication network 106, and/or another network.

In other examples, one or more of the components of system 200 may be provided in any combination of separate systems, which in some examples may include remote (e.g., cloud) systems. For example, in an example embodiment, the cloud controller 224 can be configured to transmit a package that includes a discovery protocol application table, particular device discovery protocols, times/intervals of protocol applications, and/or blocked/allowed device lists to one or more of a plurality of gateway devices 112 of a plurality of subscribers 108a-n.

In some examples, the cloud controller 224, gateway device 112, and/or other component includes, is configured as, or is operatively connected to a machine learning engine that uses machine learning capabilities to learn about the configuration of the second communication network 106 at a subscriber location, including information about the gateway device 112, the MoCA® nodes 232 connected to the network, and in some examples, connected devices 214 provisioned by the service provider 102 and associated with the subscriber's account and/or one or more other subscriber accounts. As an example, machine learning capabilities can be used to learn about the configuration of devices used by a nearby subscriber in order to detect when a MoCA®-enabled device of the nearby subscriber is accessing the second communication network 106 of subscriber 108a.

Detected devices of the other subscriber can be added to a blocked list and used by the gateway device 112 and/or cloud controller 224 as part of blocking or limited access to any unauthorized device. For example, information about the gateway device 112 may include the protocol(s) used, security type, network band and channel information, MAC address, the version of DOCSIS®, the version of MoCA® supported, etc. In some examples, information about the MoCA® nodes 232 may include identifications (e.g., MAC addresses, IP addresses, etc.) and types of MoCA® nodes 232 that are on the network, the version of MoCA® (i.e., which MoCA® protocol(s)) that the nodes support, modulation type used, MoCA® frequency spectrum range usages by the nodes, data rates and signal strengths between MoCA® nodes 232 (which may vary depending on the physical characteristics of the path between the transmit and receive nodes), hardware version information, software version information, etc.

In some examples, the cloud controller 224 and/or gateway device 112 can utilize machine learning to learn data usage behaviors (e.g., usage of a particular delivery network, amount of usage, time of usage, etc.). For example, the cloud controller 224 may store network configuration data and usage data in cloud controller storage 236, and the machine learning engine may analyze the stored data for learning the network topologies and usage behaviors (e.g., usage of a subscriber, usage of a plurality of subscribers on a same node 206, usage of different devices 214, etc.). Accordingly, the cloud controller 224 and/or gateway device 112 can select device discovery protocols to apply based at least in part on machine-learned network information, usage behaviors, various business rules, etc.

The cloud controller 224 can store device discovery data received from gateway device 112 in the cloud controller storage 236. Gateway device 112 can maintain a local list or database of detected devices connected to the second communication network 106 including blocked devices, previously detected unauthorized devices, unknown devices, registered devices, and/or devices allowed to access and use the second communication network 106 at the location of subscriber 108a in store 229. As described below, gateway device 112 is configured to transmit all or a portion of local device discovery database 226 to the cloud controller 224 for storing in cloud controller storage 236. Cloud controller storage 236 can include the device discovery information associated with a plurality of nodes and/or individual subscriber locations. In some examples, the cloud controller storage 236 may be configured to store various data, including network and device information associated with a subscriber premises, such as information of the devices 214, frequency utilization information and channels used, filter coefficients for enabling, disabling, or otherwise configuring the frequency filter 228, information about a presence of a Point of Entry (POE) filter 234, etc.

In some examples, a POE filter 234 may be installed at the subscriber 108a location to prevent MoCA® signals from escaping and entering other subscriber 108b-n locations. In one embodiment, the POE filter 234 can be configured as a 2-way filter to also block or limit signals from other subscriber 108b-n locations from reaching the gateway devices 112 at the subscriber 108a location. Gateway device 112, a network node, or another component can include a frequency filter 228 that can be used to prevent or block unauthorized or unknown devices from accessing the second communication network 106. For example, the frequency filter 228 of an embodiment can be selectively configured as a stopband filter to filter out a certain range of frequencies transmitting to the gateway device 112. The frequency filter 228 may be configured as a low-pass or band-pass filter that limits certain DOCSIS® channels from being used that may interfere with a MoCA® channel operating within the same frequency spectrum range or vice versa.

Figure 3:
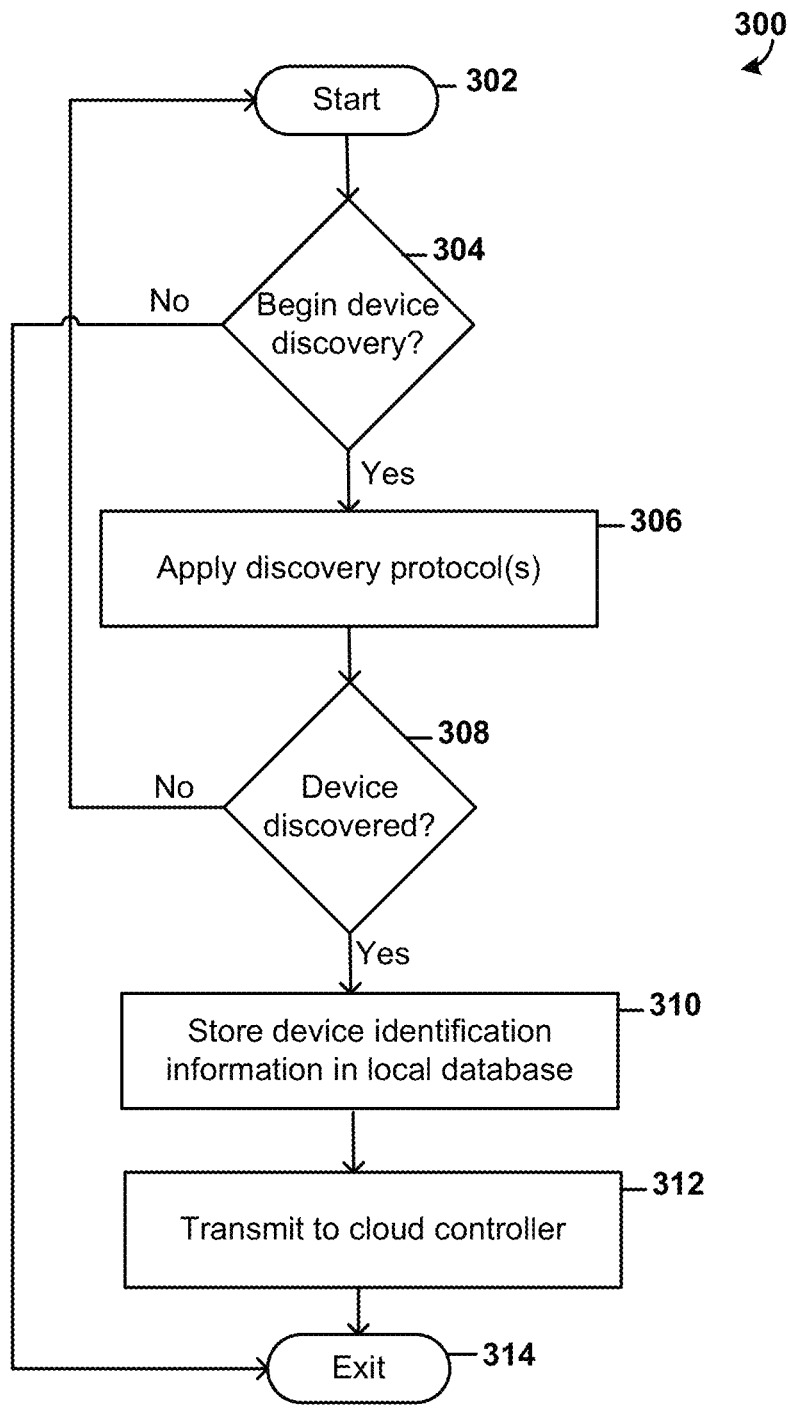
FIG. 3 depicts a process of detecting devices connected to a communication network according to an embodiment.

FIG. 3 depicts a process 300 of detecting devices connected to a communication network, such as a local communication network 106 that includes MoCA®-enabled devices for example. Process 300 starts a device discovery algorithm at 302 and proceeds to 304 to determine whether to begin or continue a device discovery service. For example, a new device discovery service can be called by the cloud controller 224 and/or the gateway device 112 when a new installation of service and/or a gateway device 112 is provided to a subscriber 108, when a new MoCA® node 232 is discovered, an actuation of a button on the gateway device 112, a user command received via a user interface (UI) provided by the cloud controller 224 and/or the gateway device 112, an instruction from the service provider head end 202 (which may be associated with a subscription or billing change, as part of a self-installation procedure, or other triggering event), etc. As an example of resuming a previously initiated device discovery service, process 300 may have been interrupted due to a loss of power, device failure, or some other interrupting event which causes process 300 to resume a previously initiated device discovery service either from beginning from the device discovery protocol that was executing during an interruption or from a next discovery protocol in a sequence (if there is a next protocol) according to a corresponding discovery protocol application table or other discovery protocol procedure to be applied for a subscriber location or group of subscriber locations.

If process 300 is not to begin or continue a device discovery service, then process 300 proceeds to 314 and exits. If process 300 is to begin or continue a device discovery service, then process 300 proceeds to 306 to begin execution of one or more of a plurality of device discovery protocols, some examples of which are described above. According to an embodiment, the process 300 at 306 is configured to refer to a discovery protocol application table stored in storage 236 at the cloud controller 224 and/or in storage 229 at the gateway device 112 and execute one or more device discovery protocols at the gateway device 112 or other component to detect and/or identify authorized and/or unauthorized devices, including MoCA®-enabled devices, connected to the second communication network 106 and/or implement countermeasures in order to block or limit access to the second communication network 106 by unauthorized devices or unknown devices. For example, the process 300 utilizes the gateway device 112 that executes one or more device discovery protocols according to a tailored discovery protocol application table for the subscriber location 108a in conjunction with the cloud controller 224 to detect unauthorized MoCA®-enabled or other unauthorized devices and/or block such devices from using to the second communication network 106. As described herein, tailored discovery algorithms can also be provided to encompass various types and/or timing of application of various discovery protocols according to the characteristics of a particular network and/or connected devices.

Referring again to FIG. 3, if no devices are discovered at 308, then process 300 returns to 302 and waits for a message to execute a next device discovery service. If the process 300 discovers devices coupled to the second communication network 106 at 308, then the process 300 proceeds to 310 to store identification information associated with any discovered devices in local database 226 in storage 229. The process of an embodiment maintains a local device discovery database 226 in storage 229 that includes identification information associated with detected devices connected to the second communication network 106 including identification information associated with blocked devices, previously detected unauthorized devices, registered devices, unknown devices, types of devices, timing/type(s) of detection, timing/type(s) of protocol application, and/or devices allowed to access and use the second communication network 106 at the location of subscriber 108a.

Process 300 then proceeds to 312 and transmits identification information associated with the detected devices to cloud controller 224. Process 300 of one embodiment transmits all or a portion of the local database 226 including any detected devices such as blocked devices, previously detected unauthorized devices, registered devices, unknown devices, types of devices, timing/type(s) of detection, timing/type(s) of protocol application, and/or allowed devices from the gateway device 112 to the cloud controller 224. While the cloud controller 224 is shown in a particular location in the architecture 200, cloud controllers can be deployed on servers throughout the service provider network, such as with data centers, back end locations, edge locations, etc. Process 300 proceeds from 312 to 314 and exits.

Figure 4:
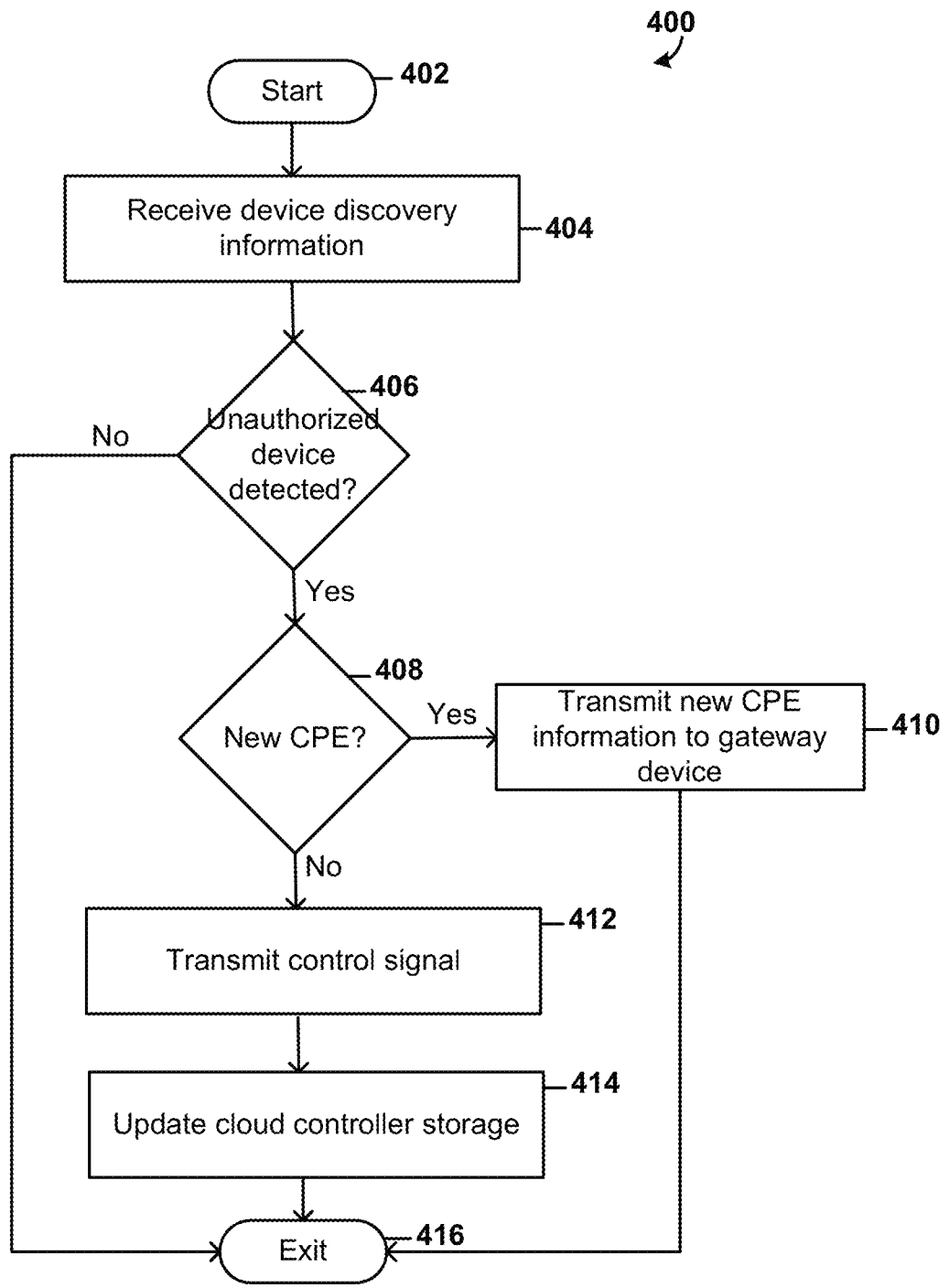
FIG. 4 depicts a process of using a cloud controller as part of detecting and/or preventing unauthorized devices from access or continued access to a communication network according to an embodiment.

FIG. 4 depicts a process 400 of using the cloud controller 224 as part of detecting and/or preventing unauthorized devices from access or continued access to the second communication network 106. Process 400 begins at 402 and proceeds to 404 where the cloud controller 224 receives device detection information from the gateway device 112. For example, cloud controller 224 may receive a list of detected devices including blocked devices, previously detected unauthorized devices, registered devices, unknown devices, types of devices, timing/type(s) of detection by the gateway device 112, timing/type(s) of protocol application by the gateway device 112, allowed devices, identification of the discovery protocol application table used, all or a portion (e.g., limited to parameter updates or newly discovered device information), and/or no new device detections. Process 400 of one embodiment receives device discovery information from a single gateway device or from a plurality of gateway devices according to a defined grouping (e.g., from one or more local nodes, received individually, received in batches according to a location and/or defined neighbor radius, etc.).

At 406, process 400 uses the cloud controller 224 to resolve device identities as part of determining whether there have been any unauthorized devices detected by the gateway device 112. For example, the cloud controller 224 can query the cloud controller storage 236 to identify device identification information that corresponds with the information sent by the gateway device 112. As described above, after executing one or more device discovery protocols, the gateway device 112 can send detection information associated with the discovery of devices connecting to or attempting to access the second communication network 106 at the location of subscriber 108a.

Gateway device 112 can be configured to send a message to the cloud controller 224 with a device discovery flag and/or any discovered device information that identifies that an unknown or unauthorized device has been discovered using the second communication network 106 at the location of subscriber 108a. Cloud controller 224 can be configured to resolve a newly discovered device by comparing device specific information of a newly discovered device with known or registered devices on the subscriber account or another subscriber account. For example, the cloud controller 224 can access a subscription database, such as an account or billing database for example, that list devices deployed for a particular subscription or service and authorized to use the service provider network and/or second communication network 106.

If an unauthorized or unknown device has been detected at 406, process 400 proceeds to 408 to determine whether new consumer premise equipment (CPE) has been added to the account by referring to the cloud controller storage 236 or other subscription data for the subscriber 108a. For example, after executing a device protocol, gateway device 112 may not recognize newly deployed premise equipment until the updated information is provided by the cloud controller 224 to the gateway device 112 for storing in storage 229. If process 400 determines that new equipment has been added at 408, process 400 at 410 uses the cloud controller 224 to send identification information for the authorized device to the gateway device 112 to update storage 229 and process 400 exits at 416. If no unauthorized or unknown device has been detected at 406, process 400 exits at 416.

If the process 400 determines that new equipment has not been added to the account of subscriber 108a or recently deployed for the account, at 408, process 400 proceeds to 412 and transmits a control signal to the gateway device 112, POE filter 234, node, or other network device to block or limit access by any unauthorized device discovered according to the discovery protocol(s). Process 400 can also send a communication to one or more user devices of a subscriber to inform of the unauthorized access, to disable MoCA® or other network functionality locally, and/or update the cloud controller storage 236 with the device information of any newly discovered device for further analysis.

In an extreme situation, cloud controller 224 can block or limit a subscriber location from accessing the service provider network until the identity of an unknown or unauthorized discovered device is known or determined. As one example, the cloud controller 224 can send a control signal to a POE filter associated with the location of subscriber 108a to control different modes of operation of configurable POE filter or frequency filter 228 that can switch from a passband or attenuator to a stopband or blocking filter to prevent unauthorized devices from communicating with the second communication network 106 at the location of subscriber 108a.

As another example, the cloud controller 224 can be configured to send blocking or interfering signals directly to the unauthorized device to thwart further communication between the unauthorized device and the gateway device 112 and/or the second communication network 106. At 414, process 400 updates the cloud controller storage 236 with an entry that identifies the unauthorized device and/or any action taken to block the unauthorized device from any further access to the second communication network 106 at the location of subscriber 108a. For example, at 414, cloud controller 224 can add an entry in device block list maintained in a server database by the service provider that includes an identifier of any unauthorized device and/or subscriber networks that the unauthorized device is blocked from accessing. At 416, process 400 exits.

Figure 5:
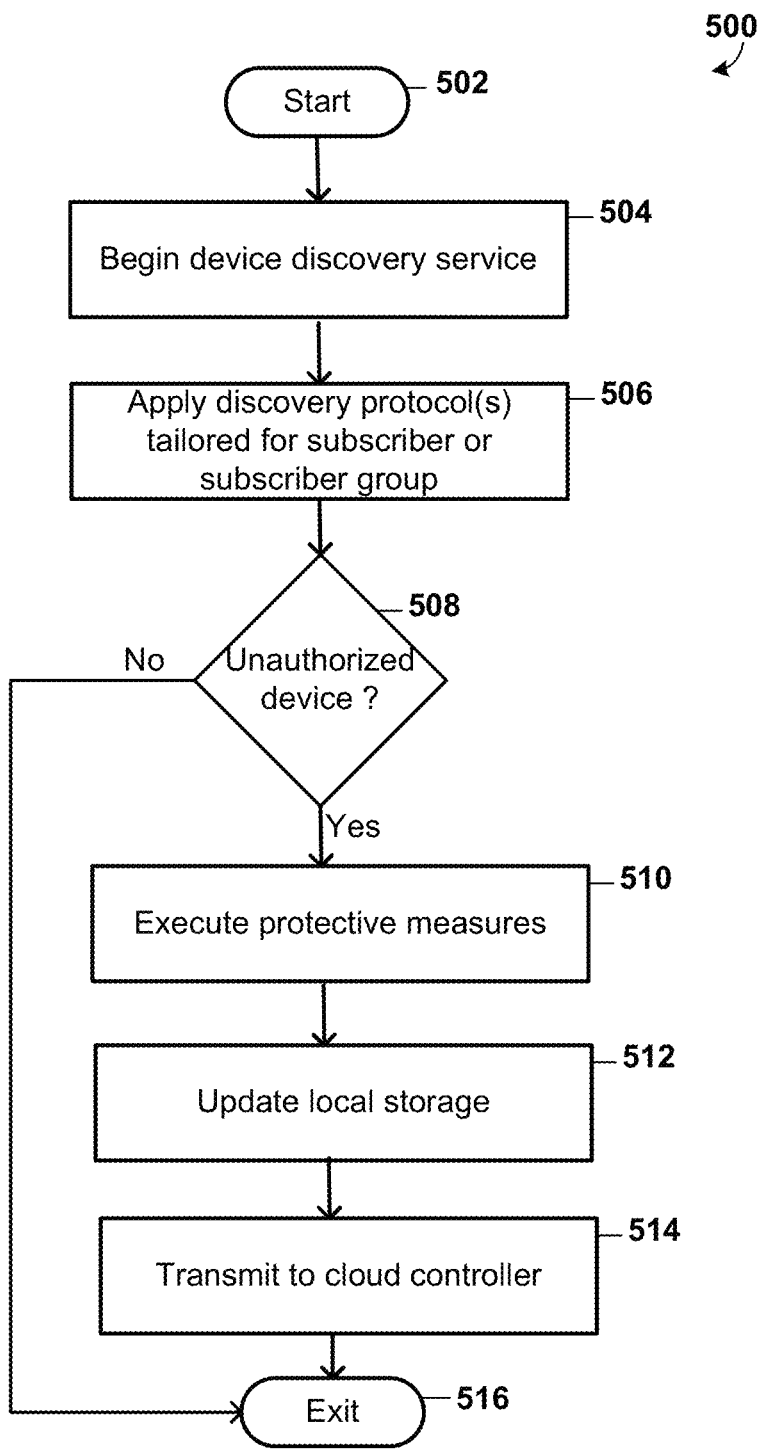
FIG. 5 depicts a process of using a gateway device at a subscriber location as part of detecting and/or preventing access or continued access to a communication network according to an embodiment.

FIG. 5 depicts a process 500 of using a gateway device 112 at a subscriber location as part of detecting and/or preventing access or continued access to the second communication network 106 at the location of subscriber 108a. Process 500 starts at 502 then proceeds to 504 and begins a device discovery service to detect devices, including known, unknown, authorized, and/or unauthorized devices, connected to or attempting to access the second communication network 106 at the location of subscriber 108a. At 506, process 500 applies one or more device discovery protocols that are tailored to the subscriber account for the subscriber location (or subscriber group) and/or associated communication equipment and communication protocols.

If application of the one or more device discovery protocols results in a determination of no unauthorized devices detected or identified at 508, process 500 exits at 516. If execution of the one or more device discovery protocols results in a determination of one or more unauthorized devices at 506, process 500 at 510 executes protective measures or countermeasures in order to block any unauthorized device from use of the second communication network 106 at the location of subscriber 108a. For example, gateway device 112 can include programmable logic in the form of executable instructions stored in a computer readable media or device to execute tailored device discovery protocols as part of a device discovery algorithm to detect devices connected to the second communication network 106 and/or use a locally stored list of blocked and/or allowed devices to determine whether a detected device is authorized to use the second communication network 106 at the location of subscriber 108a.

In one embodiment, process 500 can operate to identify a detected device as an authorized device by: comparing any detected device information to device information listed in billing or equipment records, comparing devices used in subscriber 108a location to detected devices that are in nearby/neighboring locations, and/or identifying when another gateway device is located at the location of subscriber 108a (always unauthorized) by receiving an IPv6 Router Advertisement from the different gateway, sending a DHCP DISCOVER from gateway device 112 to which the unauthorized gateway responds, and/or, performing IGD (UPnP) gateway discovery. The cloud controller 224 can transmit device information of discovered unauthorized devices to include in a locally stored blocked list at the subscriber 108a location.

Once an unauthorized device is detected, process 500 of an embodiment at 508 uses the gateway device 112 and/or cloud controller 224 to disable a network interface, such as MoCA® interface 220, a MoCA® adapter, and/or other MoCA®-enabled device, send a control signal to POE filter 234 or frequency filter 228 to enter a blocking or stopband mode, and/or send a jamming signal to any unauthorized device. As one implementation example, in the case where access by an unauthorized device is due to another subscriber having removed their own POE filter (or they don't have a POE filter installed), the process 500 can decrease the transmit power or increase the minimum receive power to prevent the unauthorized device from joining the MoCA® network of subscriber 108a. In cases where a single POE filter is insufficient to block the unauthorized connection (POE filter not providing sufficient attenuation), process 500 enables the subscriber network to function as expected while disallowing unauthorized devices to join the MoCA® network of subscriber 108a.

At 512, process 500 updates storage 229 (e.g., detection table or list, local database, etc.) with identifying information associated with any detected unauthorized device. For example, the gateway device 112 can update a local database with a MAC address, IP address, one or more discovery protocols used to detect a device, a time and date of detection, and/or type of countermeasure(s) used associated with an unauthorized device. At 514, process 500 transmits the identifying information associated with any detected unauthorized device to the cloud controller 224 and exits at 516.

Figure 6:
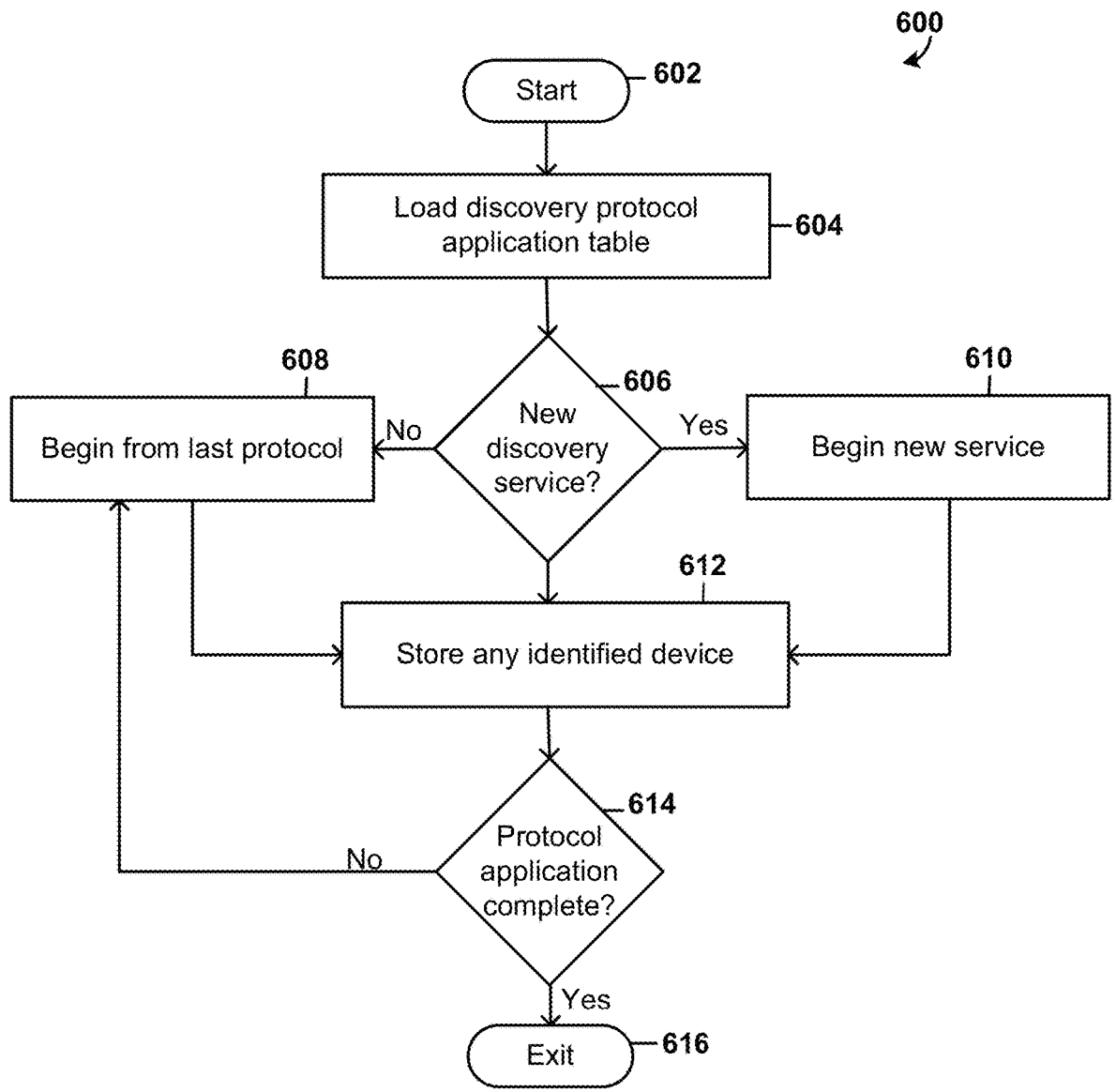
FIG. 6 depicts a process of discovering and/or identifying devices connected to or attempting to access an unauthorized MoCA® network.

FIG. 6 depicts a process 600 of discovering and/or identifying devices connected to or attempting to access an unauthorized MoCA® network. At 602, process 600 begins executing a device discovery algorithm at a subscriber's gateway device. At 604, process 600 loads a discovery protocol application table associated with a corresponding subscriber account. For example, process 600 can load one or more discovery protocols to be applied for a subscriber premises according to a discovery protocol application table associated with account information stored at the service provider's data center (e.g., data services 1026 in FIG. 10). FIG. 7 provides an example of a discovery protocol application table for one or more subscribers, subscriber groups, node groups, etc. that may be applied by a gateway device 112 or other device to discover devices that are not authorized to access a local network of another subscriber or other entity.

If process 600 determines at 606 that a new device discovery process is to be executed, and not a continued application of an incomplete device discovery protocol according to the discovery protocol application table associated with the subscriber account, then process 600 proceeds to 610. For example, process 600 may locally store or request a device discovery completion flag once all discovery protocols have been executed for a subscriber according to the corresponding discovery protocol application table.

If process 600 determines a continued device discovery process at 606, then process 600 proceeds to 608 and begins device discovery from the last initiated device discovery protocol according to the discovery protocol application table. If process 600 determines at 606 that this is a new discovery process, then process 600 at 610 begins the device discovery by executing a first discovery protocol type and/or protocol grouping (e.g., priority one protocol or group of discovery protocols) according to the discovery protocol application table for the subscriber 108. At 612, process 600 adds any newly identified devices to local storage 229. If all of the device discovery protocols have been applied according to the discovery protocol application table for the subscriber at 614, process 600 ends at 616. Otherwise, if there are remaining device discovery protocols to be applied according to the discovery protocol application table for the subscriber at 614, process 600 returns to 610.

FIG. 7 depicts an exemplary discovery protocol application table 700. As shown in FIG. 7, the table 700 includes tailored device discovery protocols to be used for subscriber 1, tailored device discovery protocols to be used for subscriber 2, tailored device discovery protocols to be used for subscriber group 1 (e.g., a plurality of subscriber locations), and tailored device discovery protocols to be used for node group 1 (e.g., a plurality of node locations). It will be appreciated that a service provider typically will include many subscribers and table 700 would include many more entries than the provided examples. All or a portion of table 700 may be stored locally in storage 229 (e.g., limited to the subscriber's tailored protocols) and/or remotely in storage 236. Table 700 can be updated with additional or fewer device discovery protocols and/or changes of application, timing, and/or priority according to each particular network and/or device configuration.

FIGS. 8A-8F depict tables 800 and 802 that include exemplary output (redacted in part) from after application of a number of device discovery protocols by gateway device 112. For example, all or a portion of the output can be stored in and/or transmitted to cloud controller 224 for storing in cloud controller storage 236 for the subscriber 108*a*. FIG. 8A depicts exemplary device discovery output 800 after application of an Address Resolution Protocol (ARP) discovery protocol device discovery protocol by the gateway device 112. FIGS. 8A-8F depict exemplary device discovery output 802 after application of Internet Protocol (IP)v6 Neighbor discovery protocol device discovery protocol by the gateway device 112. According to an aspect, all or select portions of the output provided by the gateway device 112 are stored locally in storage 229 and/or cloud controller storage 236.

Figure 9:
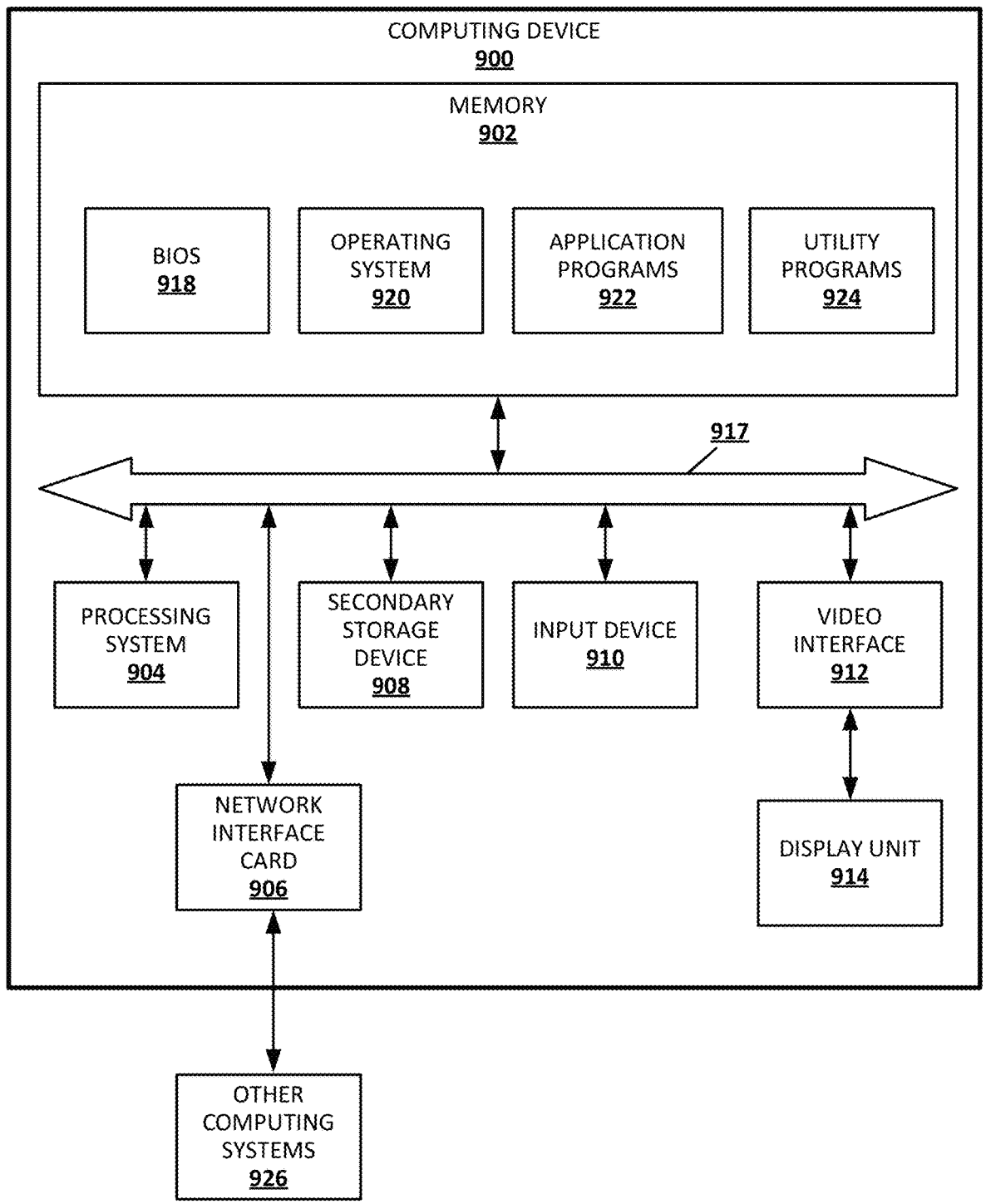
FIG. 9 is a block diagram illustrating example physical components of a computing device or system with which embodiments may be practiced.

FIG. 9 is a block diagram illustrating example physical components of a computing device 900 or system with which embodiments may be practiced. It should be appreciated that in other embodiments, different hardware components other than those illustrated in the example of FIG. 9 may be used. Computing devices may be implemented in different ways in different embodiments. For instance, in the example of FIG. 9, the computing device 900 includes a processing system 904, memory 902, a network interface card 906 (wired and/or wireless), a secondary storage device 908, an input device 910, a video interface 912, a display unit 914, and a communication medium 917. In other embodiments, the computing device 900 may be implemented using more or fewer hardware components (e.g., a video interface, a display unit, or an input device) or in combination with other types of computer systems 926 and program modules.

The memory 902 includes one or more computer-readable storage media capable of storing data and/or computer-executable instructions. Memory 902 may store the computer-executable instructions that, when executed by a processor or processing unit of the processing system 904, cause operations, such as the operations described above with respect to FIGS. 3-6). In various embodiments, the memory 902 is implemented in various ways. For example, the memory 902 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 904 includes one or more processing units (e.g., one or more processors), which may include tangible integrated circuits that selectively execute computer-executable instructions. In various embodiments, the processing units in the processing system 904 are implemented in various ways. For example, the processing units in the processing system 904 can be implemented as one or more processing cores. In this example, the processing system 904 can comprise one or more microprocessors. In another example, the processing system 904 can comprise one or more separate microprocessors. In yet another example embodiment, the processing system 904 can comprise Application-Specific Integrated Circuits (ASICs) that provide specific functionality. In yet another example, the processing system 904 provides specific functionality by using an ASIC and by executing computer-executable instructions.

The computing device 900 may be enabled to send data to and receive data from a communication network via a network interface card 906. In different embodiments, the network interface card 906 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 908 includes one or more computer-readable storage media, and may store data and computer-executable instructions not directly accessible by the processing system 904. That is, the processing system 904 performs an I/O operation to retrieve data and/or computer-executable instructions from the secondary storage device 908. In various embodiments, the secondary storage device 908 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 910 enables the computing device 900 to receive input from a user. Example types of input devices include, but are not limited to, keyboards, mice, trackballs, stylus input devices, key pads, microphones, joysticks, touch-sensitive display screens, and other types of devices that provide user input to the computing device 900.

The video interface 912 outputs video information to the display unit 914. In different embodiments, the video interface 912 is implemented in different ways. For example, the video interface 912 is a video expansion card. In another example, the video interface 912 is integrated into a motherboard of the computing device 900. In various embodiments, the display unit 914 can be an LCD display panel, a touch-sensitive display panel, an LED screen, a projector, a cathode-ray tube display, or another type of display unit. In various embodiments, the video interface 912 communicates with the display unit 914 in various ways. For example, the video interface 912 can communicate with the display unit 914 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 917 facilitates communication among the hardware components of the computing device 900. In different embodiments, the communications medium 917 facilitates communication among different components of the computing device 900. For instance, in the example of FIG. 9, the communications medium 917 facilitates communication among the memory 902, the processing system 904, the network interface card 906, the secondary storage device 908, the input device 910, and the video interface 912. In different embodiments, the communications medium 917 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 902 stores various types of data and/or software instructions. For instance, in the example of FIG. 9, the memory 902 stores a Basic Input/Output System (BIOS) 918, and an operating system 920. The BIOS 918 includes a set of software instructions that, when executed by the processing system 904, cause the computing device 900 to boot up. The operating system 920 includes a set of software instructions that, when executed by the processing system 904, cause the computing device 900 to provide an operating system that coordinates the activities and sharing of resources of the computing device 900. The memory 902 also stores one or more application programs or program code 922 that, when executed by the processing system 904, cause the computing device 900 to provide applications to users. The memory 902 also stores one or more utility programs 924 that, when executed by the processing system 904, cause the computing device 900 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figure 10:
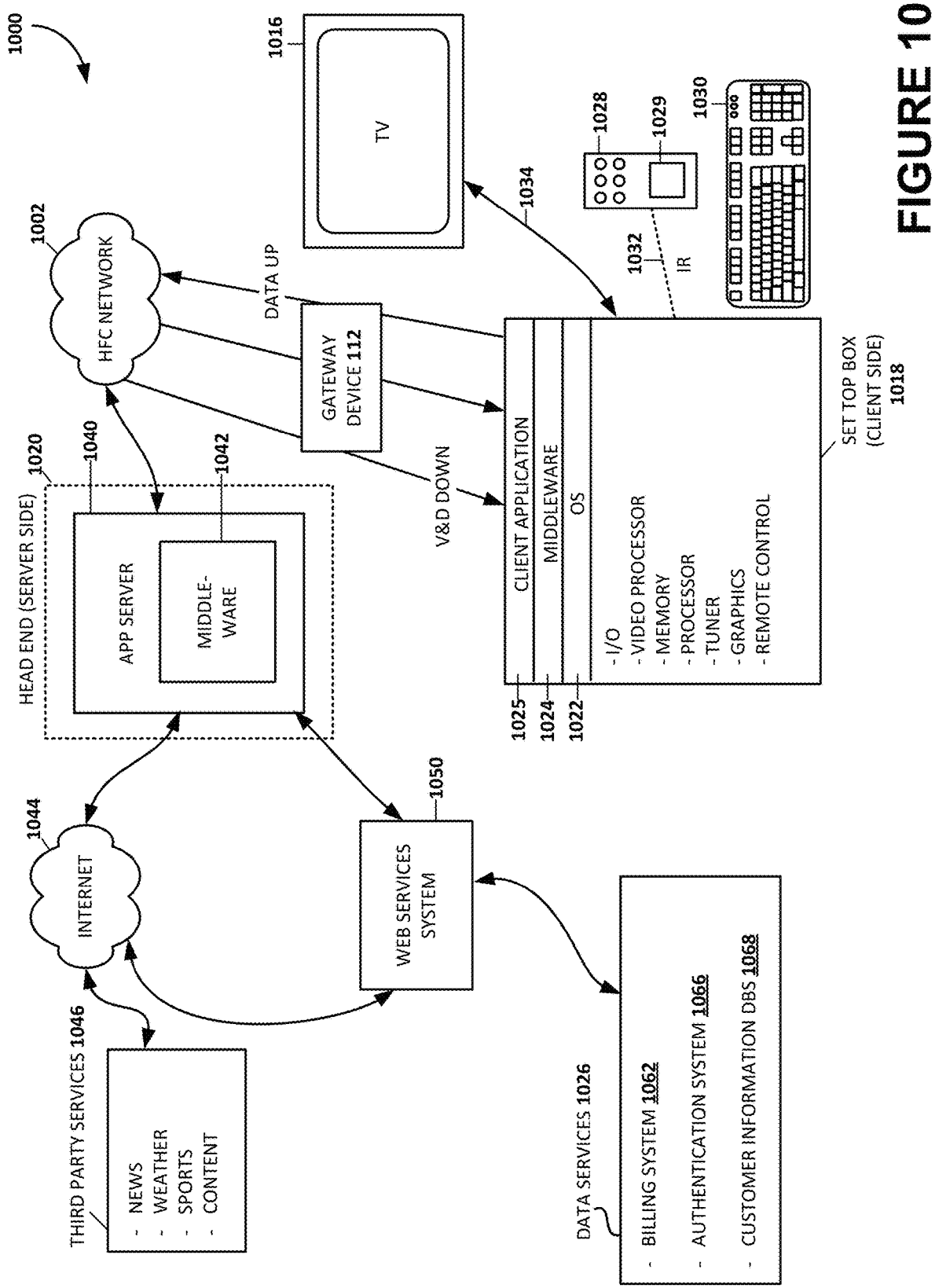
FIG. 10 is a block diagram illustrating components of a cable services system architecture providing an example operating environment according to aspects of the present disclosure.

FIG. 10 is a block diagram illustrating a cable television services system 1000 (hereafter referred to as "CATV") architecture providing an operating environment according to an aspect. According to aspects, the service provider 102 may operate in the form of a CATV 1000 as illustrated and described in FIG. 10. As should be appreciated, a CATV services system 1000 is but one of various types of systems that can be utilized for providing an operating environment. Referring now to FIG. 10, digital and analog video programming, information content and interactive television services are provided via a HFC network 1002 to a television set 1016 for consumption by a cable television/services system customer. As is known to those skilled in the art, HFC networks 1002 combine both fiber optic cable lines and coaxial cable lines. Typically, fiber optic cable lines run from the cable head end 1020 to neighborhoods of subscribers. Coaxial cable lines run from the optical fiber feeders to each customer or subscriber.

The CATV system 1000 is in the form of a distributed client-server computing system for providing video and data flow across the HFC network 1002 between server-side services providers (e.g., cable television/services providers), such as video content feed provider 102a, via a server-side head end 1020 and a client-side customer via a set-top box (STB) 1018 functionally connected to a customer receiving device, such as the television set 1016. The functionality of the HFC network 1002 allows for efficient bidirectional data flow between the set-top box 1018 and an application server 1040 of the server-side head end 1020. As is understood by those skilled in the art, modern CATV systems 1000 can provide a variety of services across the HFC network 1002 including traditional digital and analog video programming, telephone services, high speed Internet access, video-on-demand, and services.

On the client side of the CATV system 1000, digital and analog video programming and digital and analog data are provided to the customer television set 1016 via the STB 1018. Interactive television services that allow a customer to input data to the CATV system 1000 likewise are provided by the STB 1018. As illustrated in FIG. 10, the STB 1018 is a multipurpose computing device having a computer processor, memory, and an input/output mechanism. The input/output mechanism receives input from server-side processes via the HFC network 1002 and from customers via input devices such as a remote control device 1028, keyboard 1030, or other computing device, such as a tablet/slate computer, smart phone, etc. The remote control device 1028 and the keyboard 1030 can communicate with the STB 1018 via a suitable communication transport such as the infrared connection 1032. The remote control device 1028 can include a biometric input module 1029. The STB 1018 also includes a video processor for processing and providing digital and analog video signaling to the television set 1016 via a cable communication transport 1034. A multi-channel tuner is provided for processing video and data to and from the STB 1018 and the server-side head end 1020, described below.

The STB 1018 also includes an operating system 1022 for directing the functions of the STB 1018 in conjunction with a variety of client applications 1025. For example, if a client application 1025 requires a news flash from a third-party news source to be displayed on the television 1016, the operating system 1022 can cause the graphics functionality and video processor of the STB 1018, for example, to output the news flash to the television 1016 at the direction of the client application 1025 responsible for displaying news items.

Because a variety of different operating systems 1022 can be utilized by a variety of different brands and types of set-top boxes 1018, a middleware layer 1024 can be provided to allow a given software application to be executed by a variety of different operating systems. According to an embodiment, the middleware layer 1024 can include a set of application programming interfaces (APIs) that are exposed to client applications and operating systems 1022 that allow client applications 1025 to communicate with the operating systems 1022 through common data calls understood via the API set. As described below, a corresponding middleware layer 1042 is included on the server side of the CATV system 1000 for facilitating communication between the server-side application server and the client-side STB 1018. The middleware layer 1042 of the server-side application server and the middleware layer 1024 of the client-side STB 1018 can format data passed between the client side and server side according to the Extensible Markup Language (XML).

According to one aspect, the STB 1018 passes digital and analog video and data signaling to the television 1016 via a one-way communication transport 1034. According to other aspects, two-way communication transports can be utilized, for example, via high definition multimedia (HDMI) ports. The STB 1018 can receive video and data from the server side of the CATV system 1000 via the HFC network 1002 through a video/data downlink and data via a data downlink. The STB 1018 can transmit data from the client side of the CATV system 1000 to the server side of the CATV system 1000 via the HFC network 1002 via one data uplink. The video/data downlink is an "in band" downlink that allows for digital and analog video and data signaling from the server side of the CATV system 1000 through the HFC network 1002 to the STB 1018 for use by the STB 1018 and for distribution to the television set 1016. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 10, between the HFC network 1002 and the set-top box 1018 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 1018 and the server-side application server 1040 is typically passed through the "out of band" data links. Alternatively, an "in band" data carousel can be positioned in an "in band" channel into which a data feed can be processed from the application server 1040 through the HFC network 1002 to the STB 1018. Operation of data transport between components of the CATV system 1000, described with reference to FIG. 10, is well known to those skilled in the art.

Referring still to FIG. 10, the head end 1020 of the CATV system 1000 is positioned on the server side of the CATV system and includes hardware and software systems responsible for originating and managing content for distributing through the HFC network 1002 to client-side STBs 1018 for presentation to customers. As described above, a number of services can be provided by the CATV system 1000, including digital and analog video programming, interactive television services, telephone services, video-on-demand services, targeted advertising, and/or provision of supplemental content.

The application server 1040 can be configured as a computing system operative to assemble and manage data sent to and received from the STB 1018 via the HFC network 1002. As described above, the application server 1040 includes a middleware layer 1042 for processing and preparing data from the head end 1020 of the CATV system 1000 for receipt and use by the client-side STB 1018. For example, the application server 1040 via the middleware layer 1042 can obtain supplemental content from third-party services 1046 via the Internet 1044 for transmitting to a customer through the HFC network 1002, the STB 1018, and recording by a local or remote DVR. For example, content metadata from a third-party content provider service can be downloaded by the application server 1040 via the Internet 1044. When the application server 1040 receives the downloaded content metadata, the middleware layer 1042 can be utilized to format the content metadata for receipt and use by the STB 1018. Therefore, content metadata can be sent and categorized based on the availability to the customer's program guide data.

According to one embodiment, data obtained and managed by the middleware layer 1042 of the application server 1040 is formatted according to the Extensible Markup Language and is passed to the STB 1018 through the HFC network 1002 where the XML-formatted data can be utilized by a client application 1025 in concert with the middleware layer 1024, as described above. As should be appreciated by those skilled in the art, a variety of third-party services data 1046, including news data, weather data, sports data and other information content can be obtained by the application server 1040 via distributed computing environments such as the Internet 1044 for provision to customers via the HFC network 1002 and the STB 1018. Additionally, the application server 1040 may receive data via the Internet 1044.

According to aspects, the application server 1040 obtains customer support services data, including billing data, information on customer work order status, answers to frequently asked questions, services provider contact information, and the like from data services 1026 for provision to the customer via an interactive television session. The data services 1026 include a number of services operated by the services provider of the CATV system 1000 which can include profile and other data associated with a given customer.

A billing system 1062 can include information such as a customer's name, street address, business identification number, Social Security number, credit history, and information regarding services and products subscribed to by the customer. According to embodiments, the billing system 1062 can also include billing data for services and products subscribed to by the customer for bill processing, billing presentment and payment receipt. An authentication system 1066 can include information such as secure user names, subscriber profiles, subscriber IDs, and passwords utilized by customers for access to network services. A customer information database 1068 can include general information about customers such as place of employment, business address, business telephone number, and demographic information such as age, gender, educational level, and the like. The customer information database 1068 can also include information on pending work orders for services or products ordered by the customer. The customer information database 1068 can also include general customer information such as answers to frequently asked customer questions and contact information for various service provider offices/departments. As should be understood, this information can be stored in a variety of disparate databases operated by the cable services provider.

Referring still to FIG. 10, web services system 1050 is illustrated between the application server 1040 and the data services 1026. According to aspects, web services system 1050 serves as a collection point for data requested from each of the disparate data services systems comprising the data services 1026. According to aspects, when the application server 1040 requires customer services data from one or more of the data services 1026, the application server 1040 passes a data query to the web services system 1050. The web services system 1050 formulates a data query to each of the available data services systems for obtaining any required data for a requesting customer as identified by a set-top box identification associated with the customer. The web services system 1050 serves as an abstraction layer between the various data services systems and the application server 1040. That is, the application server 1040 is not required to communicate with the disparate data services systems, nor is the application server 1040 required to understand the data structures or data types utilized by the disparate data services systems. The web services system 1050 is operative to communicate with each of the disparate data services systems for obtaining necessary customer data. The customer data obtained by the web services system is assembled and is returned to the application server 1040 for ultimate processing via the middleware layer 1042, as described above. As should be understood by those skilled in the art, the disparate systems 1050, 1062, 1066, 1068 can be integrated or provided in any combination of separate systems, wherein FIG. 10 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

What is claimed is:

1. A system comprising:
    a cloud controller coupled to a first network; and
    a gateway device that includes a Multimedia over Coax Alliance (MoCA®) interface, wherein the gateway device is coupled to a second network comprising a local network including an MoCA® network, the gateway device configured to:
    execute a device detection algorithm to detect devices connected to or attempting to access the local network, including one or more neighbor devices using the MoCA® network;
    apply a discovery protocol to discover the detected devices connected to the local network, including discovering detection information associated with the detected devices;
    comparing the discovered detection information associated with the detected devices against a device discovery database;
    for each detected device that is not listed as an authorized device in the device discovery database, implement a countermeasure to block or limit that detected device, as an unauthorized device, from accessing the local network;
    store the discovered detection information for each unauthorized device in the device discovery database; and
    transmit all or a portion of the discovered detection information for each unauthorized device to the cloud controller.

2. The system of claim 1, wherein the gateway device is further configured to implement one or more additional countermeasures to prevent access by any unauthorized device to the local network, the gateway device to:
    send a control signal to a point of entry (POE) filter or a frequency filter; and
    send a jamming signal to any unauthorized device.

3. The system of claim 1, wherein the cloud controller operates to query a subscriber database to identify devices connected to the gateway device after receiving all or portion of the device discovery database from the gateway device.

4. The system of claim 1, wherein the gateway device includes the MoCA® interface operable to discover MoCA® enabled devices connected to the local network.

5. The system of claim 1, wherein the gateway device includes a discovery algorithm to apply the discovery protocol to identify one or more authorized devices and/or one or more unauthorized devices connected to the local network including MoCA® enabled devices of another subscriber.

6. The system of claim 5, wherein the gateway device operates to report one or more unauthorized devices connected to the local network to the cloud controller, and the cloud controller identifies the same devices in multiple locations, indicating an unauthorized connecting of the multiple locations.

7. The system of claim 6, wherein the gateway device or the cloud controller operates to block or limit access by the one or more unauthorized devices to the local network.

8. The system of claim 5, wherein the gateway device transmits a flag to the cloud controller to convey that the local network has been accessed by the unauthorized device or by the one or more unknown devices.

9. The system of claim 5, wherein the gateway device operates to generate the device discovery database, comprising the discovered detection information of the one or more authorized devices connected to the local network and the one or more unauthorized devices connected to the local network, including a device identifier, a time of detection, a network address, and/or a discovery protocol that the one or more authorized devices or the one or more unauthorized devices responded to.

10. The system of claim 9, wherein the gateway device operates to transmit the device identifier, time of detection, network address, and/or one or more responsive discovery protocols to the cloud controller.

11. The system of claim 1, wherein the discovery protocol is selected from an MoCA® controller discovery protocol, a Dynamic Host Configuration Protocol (DHCP) Server discovery protocol, a DHCPv6 discovery protocol, an Internet Protocol (IP)v6 Neighbor discovery protocol, an IPv6 Router advertisements discovery protocol, an Address Resolution Protocol (ARP) discovery protocol, an Universal Plug and Play (UPnP) and/or Digital Living Network Alliance (DLNA) discovery protocol, a multicast Domain Name System (mDNS) discovery protocol, and/or a Wi-Fi Access Point discovery protocol.

12. A method comprising:
    providing, via a gateway device that includes a Multimedia over Coax Alliance (MoCA®) interface, access to a local network including an MoCA® network;
    executing a device detection algorithm to detect devices connected to or attempting to access the local network, including one or more neighbor devices using the MoCA® network;
    applying, via the gateway device, a device discovery protocol to discover the detected devices connected to the local network, including discovering detection information associated with the detected devices;

comparing the discovered detection information associated with the detected devices against a device discovery database;

for each detected device that is not listed as an authorized device in the device discovery database, implement a countermeasure to block or limit that detected device, as an unauthorized device, from accessing the local network;

storing the discovered detection information for each unauthorized device in the device discovery database; and transmitting, via the gateway device, all or a portion of the discovered detection information for each unauthorized device to a cloud controller.

13. The method of claim 12, further comprising using the discovery algorithm to load a discovery protocol application table to apply the discovery protocol to identify unauthorized devices connected to the local network.

14. The method of claim 13, further comprising reporting any unauthorized devices connected to the local network to the cloud controller.

15. The method of claim 12, wherein the discovery protocol is selected from an MoCA® controller discovery protocol, a Dynamic Host Configuration Protocol (DHCP) discovery protocol, a DHCPv6 discovery protocol, an Internet Protocol (IP)v6 Neighbor discovery protocol, an IPv6 Router advertisements discovery protocol, an Address Resolution Protocol (ARP) discovery protocol, an Universal Plug and Play (UPnP) and/or Digital Living Network Alliance (DLNA) discovery protocol, a multicast Domain Name System (mDNS) discovery protocol, and/or a Wi-Fi Access Point discovery protocol.

16. The method of claim 12, further comprising generating the device discovery database, comprising the discovered detection information, to include one or more authorized devices connected to the MoCA® network and any unauthorized devices connected to the MoCA® network, including a device identifier, a time of detection, a network address, and/or a discovery protocol that the one or more authorized devices or the one or more unauthorized devices responded to.

17. The method of claim 12, further comprising sending a command signal from the cloud controller to the gateway device to disconnect, prevent, or limit access by the unauthorized device to the local network.

18. A non-transitory computer-readable medium, including instructions which, when executed on a gateway device that includes a Multimedia over Coax Alliance (MoCA®) interface, coupled to a local network including an MoCA® network, operate to:

execute a device detection algorithm to detect devices connected to or attempting to access the local network, including one or more neighbor devices using the MoCA® network;

apply a discovery protocol to discover the detected devices connected to the local network, including discovering detection information associated with the detected devices;

comparing the discovered detection information associated with the detected devices against a device discovery database;

for each detected device that is not listed as an authorized device in the device discovery database, implement a countermeasure to block or limit that detected device, as an unauthorized device, from accessing the local network;

store the discovered detection information for each unauthorized device in the device discovery database; and transmit the discovered detection information for each unauthorized device to a cloud controller.

19. The non-transitory computer-readable medium of claim 18, wherein the instructions further operate to receive a command signal at the gateway device from the cloud controller to disconnect, prevent, or limit access by the unauthorized device to the local network.

20. The non-transitory computer-readable medium of claim 18, wherein the discovery protocol is selected from an MoCA® controller discovery protocol, a Dynamic Host Configuration Protocol (DHCP) discovery protocol, a DHCPv6 discovery protocol, an Internet Protocol (IP)v6 Neighbor discovery protocol, an IPv6 Router advertisements discovery protocol, an Address Resolution Protocol (ARP) discovery protocol, an Universal Plug and Play (UPnP) and/or Digital Living Network Alliance (DLNA) discovery protocol, a multicast Domain Name System (mDNS) discovery protocol, and/or a Wi-Fi Access Point discovery protocol.

* * * * *